United States Patent
Huang et al.

(10) Patent No.: US 9,480,035 B2
(45) Date of Patent: Oct. 25, 2016

(54) IN-SYNCHRONIZATION AND OUT-OF-SYNCHRONIZATION HANDLING METHOD AND APPARATUS

(71) Applicant: HUAWEI TECHNOLOGIES CO., LTD., Shenzen, Guangdong (CN)

(72) Inventors: Jinbo Huang, Shanghai (CN); Xueli Ma, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 263 days.

(21) Appl. No.: 14/065,819

(22) Filed: Oct. 29, 2013

(65) Prior Publication Data

US 2014/0177621 A1    Jun. 26, 2014

(30) Foreign Application Priority Data

Dec. 25, 2012 (CN) .......................... 2012 1 0571684

(51) Int. Cl.
*H04W 56/00* (2009.01)

(52) U.S. Cl.
CPC ................................. *H04W 56/003* (2013.01)

(58) Field of Classification Search
None
See application file for complete search history.

(56) References Cited

U.S. PATENT DOCUMENTS

| | | | |
|---|---|---|---|
| 2008/0198763 A1* | 8/2008 | Fischer et al. | 370/254 |
| 2011/0021154 A1* | 1/2011 | Marinier et al. | 455/67.11 |
| 2011/0211458 A1* | 9/2011 | Ishii et al. | 370/242 |
| 2013/0250782 A1* | 9/2013 | Nimbalker et al. | 370/252 |
| 2013/0301434 A1* | 11/2013 | Krishnamurthy et al. | 370/252 |
| 2013/0315157 A1* | 11/2013 | Krishnamurthy et al. | 370/329 |
| 2014/0086123 A1* | 3/2014 | Deivasigamani et al. | 370/311 |

\* cited by examiner

*Primary Examiner* — Hassan Kizou
*Assistant Examiner* — Roberta A Shand
(74) *Attorney, Agent, or Firm* — Staas & Halsey LLP

(57) ABSTRACT

The present invention is applicable to the field of communications technologies, and provides an in-synchronization and out-of-synchronization handling method and apparatus. The method includes: reporting, by a physical layer, an invalid frame indication to a high layer, where the invalid frame indication is used to indicate an invalid frame, and the invalid frame is a frame not used for detecting out-of-synchronization, so as to count the number of frames that are assured to be out of synchronization within timing; and when the number of frames that are assured to be out of synchronization within the timing reaches a predefined value, determining that a radio link is out of synchronization. By using the present invention, the modified timing of the timer and the number of in-synchronization indications correspond to each other.

16 Claims, 4 Drawing Sheets

US 9,480,035 B2

IN-SYNCHRONIZATION AND OUT-OF-SYNCHRONIZATION HANDLING METHOD AND APPARATUS

CROSS-REFERENCE TO RELATED APPLICATIONS

This application claims priority to Chinese Patent Application No. 201210571684.1, filed on Dec. 25, 2012, which is hereby incorporated by reference in its entirety.

TECHNICAL FIELD

The present invention relates to the field of communication technologies, and in particular, to an in-synchronization and out-of-synchronization handling method and apparatus.

BACKGROUND

In the existing in-synchronization and out-of-synchronization determination under continuous packet connectivity (Continuous Packet Connectivity, CPC) discontinuous reception (Discontinuous Reception, DRX), a physical layer (also referred to as Layer 1, L1) of a user equipment (User Equipment, UE) performs in-synchronization and out-of-synchronization detection only on a valid radio frame of a slot (SLOT) of a fractional dedicated physical channel (Fractional Dedicated Physical Channel, F-DPCH), and reports the detection result to a high layer of the UE. According to an existing 3GPP (Third Generation Partnership Project) protocol, the high layer of the UE, upon receiving multiple (for example, N313) out-of-synchronization indications reported by the physical layer, starts a specific (number T313) timer. The high layer of the UE stops and resets the T313 timer if multiple (for example, N315) in-synchronization indications are received before the T313 timer expires; and determines that a current radio link fails if the T313 timer expires before N315 in-synchronization indications are received, which triggers corresponding radio link failure handling.

However, during a period where the T313 timer performs timing, all frames (that is, radio frames under a valid slot) under non-CPC DRX are valid, but not all frames under CPC DRX are valid where invalid frames (that is, radio frames under an invalid slot) exist. No in-synchronization and out-of-synchronization detection is performed within the invalid frames, resulting in that the duration of T313 and the number of counted in-synchronization indications do not increase proportionally (as shown in FIG. 1). Therefore, the existing in-synchronization and out-of-synchronization determination method based on non-CPC DRX is not fully proper for CPC DRX, and makes it more likely to determine a radio link failure.

SUMMARY

An objective of embodiments of the present invention is to provide an in-synchronization and out-of-synchronization handling method to solve the problem of in-synchronization and out-of-synchronization determination under CPC DRX.

In a first aspect, an embodiment of the present invention provides an in-synchronization and out-of-synchronization handling method, where the method includes:

reporting an invalid frame indication to a high layer by using a physical layer, where the invalid frame indication is used to indicate an invalid frame, and the invalid frame is a frame not used for detecting out-of-synchronization;

upon receiving, by the high layer, the invalid frame indication, modifying timing of a timer by using the high layer to calculate the number of frames that are assured to be out of synchronization within the timing; and when the number of frames that are assured to be out of synchronization reaches a predefined value within the timing, determining that radio link is out of synchronization.

In a first possible implementation of the first aspect, the modifying the timing of the timer by using the high layer to calculate the number of frames that are assured to be out of synchronization within the timing includes:

suspending, by using the high layer, timing of the timer in the invalid frame, so that the high layer performs timing by using the timer only within valid frames that do not include the invalid frame indication, to calculate the number of frames that are assured to be out of synchronization within the timing, where the valid frame is a frame used for detecting out-of-synchronization.

In a second possible implementation of the first aspect, the modifying the timing of the timer by using the high layer to calculate the number of frames that are assured to be out of synchronization within the timing includes:

increasing, by using the high layer, duration to obtain the timing, where the increased duration is duration of the invalid frame received by the high layer, so that the high layer counts the number of frames that are not out of synchronization within the timing, to obtain the number of frames that are assured to be out of synchronization within the timing.

With reference to the first aspect or the first possible implementation of the first aspect or the second implementation of the first aspect, in a third possible implementation, the method further includes: when the number of frames that are out of synchronization within the timing does not reach the predefined value, determining that the radio link is not out of synchronization.

With reference to the first aspect or the first possible implementation of the first aspect or the second possible implementation of the first aspect or the third possible implementation of the first aspect, in a fourth possible implementation, the radio link is a radio communication link of a base station or a user equipment.

In a second aspect, an embodiment of the present invention provides an in-synchronization and out-of-synchronization handling apparatus, where the apparatus includes:

a reporting unit, configured to report an invalid frame indication to a high layer by using a physical layer, where the invalid frame indication is used to indicate an invalid frame, and the invalid frame is a frame not used for detecting out-of-synchronization;

a handling unit, configured to modify timing of a timer by using the high layer when the high layer receives the invalid frame indication, so as to calculate the number of frames that are assured to be out of synchronization within the timing; and a determining unit, configured to determine, when the number of frames that are assured to be out of synchronization within the timing reaches a predefined value, that radio link is out of synchronization.

In a first possible implementation of the second aspect, the handling unit is specifically configured to suspend timing of the timer within the invalid frame by using the high layer when the high layer receives the invalid frame indication, so that the high layer performs timing by using the timer only within valid frames that do not include the invalid frame indication, to calculate the number of frames that are assured to be out of synchronization within the timing, where the valid frame is a frame used for detecting out-of-synchronization.

In a second possible implementation of the second aspect, the handling unit is specifically configured to increase duration to obtain the timing by using the high layer when the high layer receives the invalid frame indication, where the increased duration is duration of the invalid frame received by the high layer, so that the high layer counts the number of frames that are not out of synchronization within the timing, to obtain the number of frames that are assured to be out of synchronization within the timing.

With reference to the second aspect or the first possible implementation of the second aspect or the second possible implementation of the second aspect, in a third possible implementation, the determining unit is further configured to determine, when the number of frames that are out of synchronization within the timing does not reach the predefined value, that the radio link is not out of synchronization.

With reference to the second aspect or the first possible implementation of the second aspect or the second possible implementation of the second aspect or the third possible implementation of the second aspect, in a fourth possible implementation, the apparatus is located within a base station or a user equipment.

Compared with the prior art, the beneficial effects of the embodiments of the present invention are that: an invalid frame indication is reported to a high layer by using a physical layer; when the high layer receives the invalid frame indication, timing of a timer is modified by using the high layer, where the modified timing of the timer and the number of in-synchronization indications increase proportionally so that more in-synchronization indications are reported before the timer expires, which increases a probability of in-synchronization indication reporting, thereby effectively avoiding the problem which makes it likely to determine a radio link failure.

BRIEF DESCRIPTION OF DRAWINGS

To illustrate the technical solutions in the embodiments of the present application more clearly, the following briefly introduces the accompanying drawings required for describing the embodiments or the prior art. Apparently, the accompanying drawings show merely some embodiments of the present application, and a person of ordinary skill in the art may still derive other drawings from these accompanying drawings without creative efforts.

DESCRIPTION OF EMBODIMENTS

Figure 1:
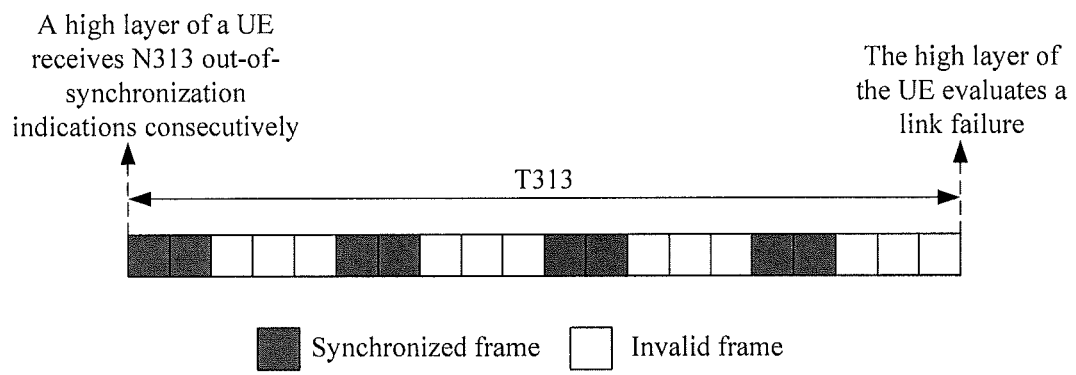
FIG. 1 is an exemplary diagram of in-synchronization and out-of-synchronization determination according to the prior art.

The following description proposes specific details such as a specific system structure, interface, and technology for the sake of description instead of limit, so as to describe the present application more clearly. However, persons skilled in the art should note that the present application can also be implemented in other embodiments without these specific details. In other cases, an apparatus, circuit, and method that are known to all are omitted in the detailed description, so as to prevent unnecessary details from hindering the description of the present application.

A technology described herein is applicable to a variety of communication systems, such as a current 2G (second generation) and 3G (third generation) communication system and a next generation communication system, for example, a Global System for Mobile Communications (GSM, Global System for Mobile communications), a Code Division Multiple Access (CDMA, Code Division Multiple Access) system, a Time Division Multiple Access (TDMA, Time Division Multiple Access) system, a Wideband Code Division Multiple Access (WCDMA, Wideband Code Division Multiple Access Wireless) system, a Frequency Division Multiple Access (FDMA, Frequency Division Multiple Addressing) system, an Orthogonal Frequency-Division Multiple Access (OFDMA, Orthogonal Frequency-Division Multiple Access) system, a sing carrier wave FDMA (SC-FDMA) system, a General Packet Radio Service (GPRS, General Packet Radio Service) system, a Long Term Evolution (LTE, Long Term Evolution) system, and other similar communication systems.

The aspects herein are described with reference to a user equipment and/or a base station and/or a base station controller.

The user equipment (User Equipment, UE) may be a wireless terminal or a wired terminal, where the wireless terminal may refer to a device providing voice and/or data connectivity for a user, a hand-held device having a wireless connection function, or another processing device connected to a wireless modem. The wireless terminal may communicate with one or more core networks through a radio access network (for example, RAN, Radio Access Network). The wireless terminal may be a mobile terminal, such as a mobile phone (which may also be referred to as a "cellular" phone) and a computer having a mobile terminal, for example, a portable, pocket-sized, handheld, computer built-in, or vehicle-mounted mobile apparatus, which exchanges voice and/or data with a radio access network. For example, the wireless terminal may be a device such as a personal communication service (PCS, Personal Communication Service) telephone, a cordless telephone, a Session Initiation Protocol (SIP) telephone, a wireless local loop (WLL, Wireless Local Loop) station, and a personal digital assistant (PDA, Personal Digital Assistant). The wireless terminal may also be referred to as a system, a subscriber unit (Subscriber Unit), a subscriber station (Subscriber Station), a mobile station (Mobile Station), a mobile (Mobile), a remote station (Remote Station), an access point (Access Point), a remote terminal (Remote Terminal), an access terminal (Access Terminal), a user terminal (User Terminal), a user agent (User Agent), a user device (User Device), or a user equipment (User Equipment).

The network side device includes a base station, a base station controller, and the like.

The base station (for example, an access point) may refer to a device that communicates with a wireless terminal through one or more sectors on an air interface in an access network. For example, the base station may be a base station (BTS, Base Transceiver Station) in GSM or CDMA, a NodeB (NodeB) in WCDMA, or an evolved NodeB (NodeB, or eNB, or e-NodeB, or evolutional Node B) in LTE. The present invention sets no limit thereto.

The base station controller may be a base station controller (BSC, base station controller) in GSM or CDMA, or a radio network controller (RNC, Radio Network Controller) in WCDMA. The present invention sets no limit thereto.

In addition, terms "system" and "network" may be used interchangeably in the embodiments of the present invention.

Figure 2:
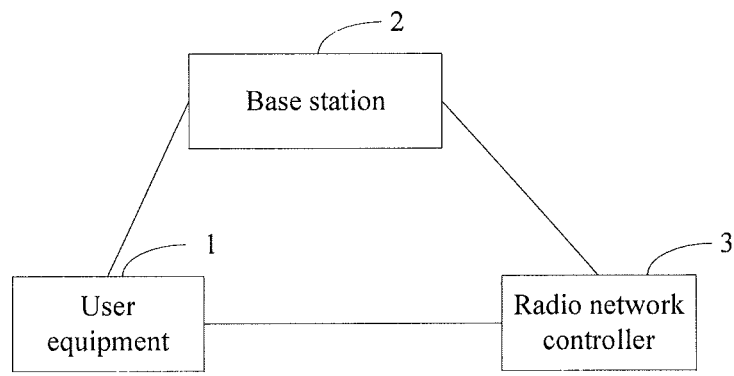
FIG. 2 is a diagram of an application scenario to which an in-synchronization and out-of-synchronization handling method according to an embodiment of the present invention is applicable.

FIG. 2 shows an application scenario to which an in-synchronization and out-of-synchronization method according to an embodiment of the present invention is applicable. For the convenience of description, only parts related to the embodiment of the present invention are illustrated.

This application scenario is in-synchronization and out-of-synchronization determination under CPC DRX and/or DTX (Discontinuous Transmission) in a WCDMA system. As shown in FIG. 2, the application scenario includes a user equipment (UE) 1, a base station (NodeB) 2, and a radio network controller (RNC) 3. The UE 1, NodeB 2, and RNC 3 communicate with each other through a network.

In this embodiment, a high layer (for example, a radio resource control layer RRC) of the UE 1 in an idle mode sends connection request information to the RNC 3 by using the high layer when a signaling connection needs to be established; the RNC 3 receives the connection request information, and then the RNC 3 sends radio link establishment request information to the NodeB 2; the NodeB 2, upon receiving the radio link establishment request information, configures radio link resource information by using a physical layer of the NodeB 2, and returns a radio link establishment message to the RNC 3 by using a high layer of the NodeB 2 after the configuration; the RNC 3 sends connection establishment information to the UE 1 upon receiving the response information; the UE 1 configures radio link resource information by using the physical layer of the UE 1 upon receiving the connection establishment information, and returns a radio link establishment message to the RNC 3 by using the high layer of the UE 1 after the configuration, thereby completing the radio link establishment between the UE 1 and the NodeB 2.

After the radio link between the UE 1 and the NodeB 2 is established successfully, the high layer of the UE is in a dedicated channel connected state (CELL_DCH). In the CELL_DCH state, the UE 1 and the NodeB 2 start to monitor an in-synchronization or out-of-synchronization state of a radio link thereof respectively. The NodeB 2 monitors an in-synchronization or out-of-synchronization state of an uplink, while the UE 1 monitors an in-synchronization or out-of-synchronization state of a downlink. The high layer of the UE 1 and the NodeB 2 sets an in-synchronization count threshold N315 or an out-of-synchronization count threshold N313 in advance. The high layer of the UE 1 starts a timer T313 when counting that the number of out-of-synchronization indications reported by the physical layer reaches the out-of-synchronization count threshold N313; if no N315 in-synchronization indications are received before the T313 timer expires, the high layer of the UE 1 releases a physical layer channel first, re-searches for an available cell, and when an available cell is found, sends cell update information to the cell and sends a cell update message to the RNC 3. The high layer of the NodeB 2 starts a timer T313 when counting that the number of out-of-synchronization indications reported by the physical layer reaches the out-of-synchronization count threshold N313; and if no N315 in-synchronization indications are received before the T313 timer expires, the NodeB 2 notifies the RNC 3 that the uplink of the UE 1 is in an out-of-synchronization state.

Figure 3A:
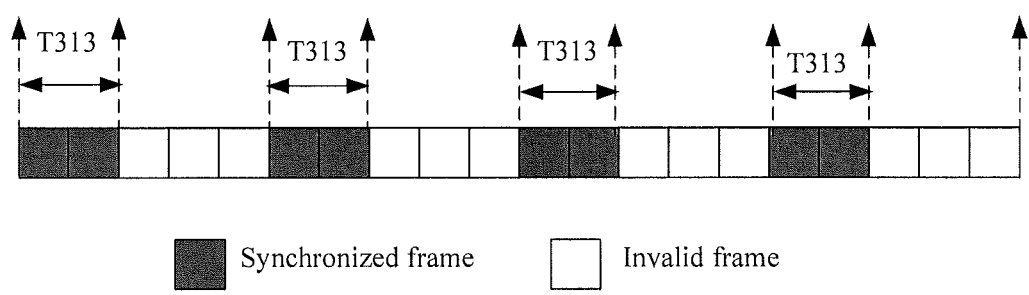
FIGS. 3a and 3b in FIG. 3 are schematic diagrams of an in-synchronization and out-of-synchronization handling method according to an embodiment of the present invention.
Figure 3B:
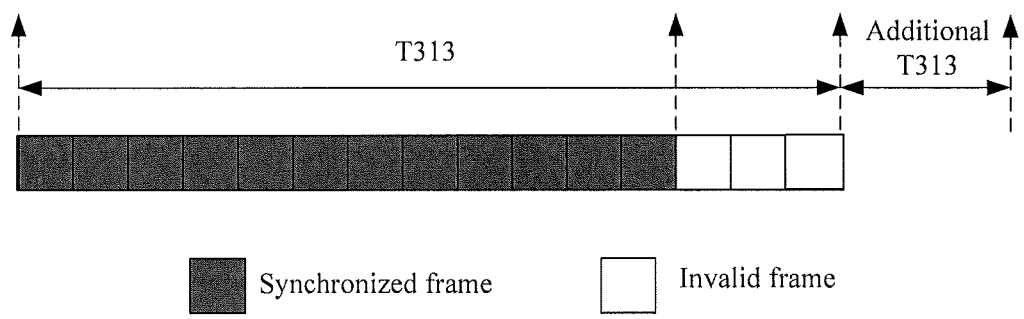

In this embodiment, an invalid frame exists under CPC DRX and/or DTX, and no in-synchronization and out-of-synchronization detection is performed in the invalid frame according to the prior art; as a result, count duration and the number of in-synchronization indications counted by the T313 timer within the timing do not increase proportionally, which makes it more likely to determine a radio link failure. However, in this embodiment, the physical layer of the UE 1 and the NodeB 2, besides reporting the in-synchronization indication or the out-of-synchronization indication to the high layer, also reports to the high layer an invalid frame indication (where the invalid frame indication is used to indicate an invalid frame, and the invalid frame is a frame not used for detecting out-of-synchronization); the high layer of the UE 1 and the NodeB 2 modifies the timing of the T313 timer upon receiving the invalid frame indication, which includes but is not limited to: suspending timing of the T313 timer for the current invalid frame, and then resuming the timing of the T313 timer by using the high layer when a next frame received by the high layer is a valid frame; or increasing duration of the T313 timer, where the increased duration is duration of the invalid frame received by the high layer so that the high layer counts the number of frames that are not out of synchronization within the timing, to obtain the number of frames that are assured to be out of synchronization within the timing, thereby ensuring that the timing of the timer T313 and the number of in-synchronization indications for in-synchronization and out-of-synchronization determination correspond to each other (as shown in FIGS. 3a and 3b), and avoiding the determination of a radio link failure.

Another Embodiment

Figure 4:
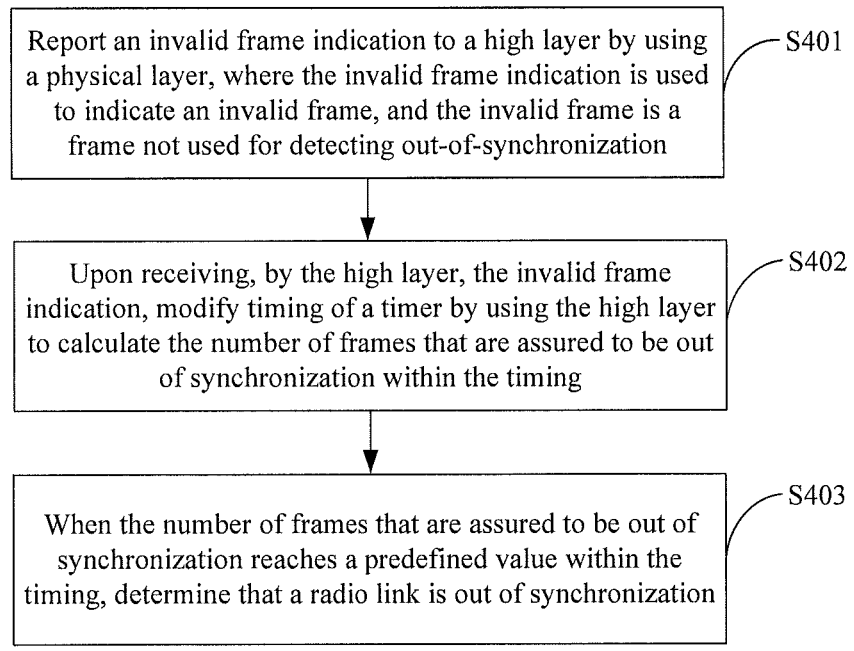
FIG. 4 is an implementation flowchart of an in-synchronization and out-of-synchronization handling method according to another embodiment of the present invention.

FIG. 4 shows a process for implementing an in-synchronization and out-of-synchronization handling method according to another embodiment of the present application, where the process of the method is described in detail as follows.

In S401, an invalid frame indication is reported to a high layer by using a physical layer, where the invalid frame indication is used to indicate an invalid frame, and the invalid frame is a frame not used for detecting out-of-synchronization.

In this embodiment, an invalid frame indication is reported when a current frame is a radio frame in an invalid slot.

It should be noted that a protocol system structure employed by an existing 3 G communication system is primarily divided into three layers, where a bottom layer is a physical layer, a middle layer is a data link layer, and a high layer is a network layer. On the UE side, the network layer (that is, the high layer) mainly refers to a radio resource control layer (RRC); on the network side, the high layer mainly refers to a node application protocol layer (NBAP).

In S402, upon receiving, by the high layer, the invalid frame indication, timing of a timer is modified by using the high layer to calculate the number of frames that are assured to be out of synchronization within the timing.

In order to ensure that the timing of the timer T313 and the number of in-synchronization indications for in-synchronization and out-of-synchronization determination correspond to each other, that is, increase proportionally, for example, the timing of T313 increases by one second and the number of in-synchronization indications increases by one. The mode for modifying the timing of the T313 timer in the embodiment includes but is not limited to any one of the following:

Mode 1: When the high layer receives the invalid frame indication, the high layer suspends timing of the timer within the invalid frame, so that the high layer performs timing by using the timer only within valid frames that do not include the invalid frame indication, to calculate the number of frames that are assured to be out of synchronization within the timing (as shown in FIG. 3a), where the valid frame is a frame used for detecting out-of-synchronization.

In this embodiment, the physical layer also needs to report a valid frame to the high layer. That is, when a current frame is a radio frame in a valid slot, a valid frame indication is reported, so that the high layer may, upon receiving the valid frame, resume the timing of the timer by using the high layer.

Mode 2: The high layer increases duration to obtain the timing, where the increased duration is duration of the invalid frame received by the high layer, so that the high layer counts the number of frames that are not out of synchronization within the timing, to obtain the number of frames that are assured to be out of synchronization within the timing (as shown in FIG. 3b).

It should be noted that under CPC DRX, the UE side may solve the uplink in-synchronization and out-of-synchronization determination problem by employing the foregoing solution. Under CPC DTX, because discontinuous transmission is performed over the uplink on the UE side, where discontinuous reception is performed on the network side, the network side under CPC DTX may also solve the uplink in-synchronization and out-of-synchronization determination problem by employing the foregoing solution.

In this embodiment, the timer includes but is not limited to the T313 timer.

Another Embodiment

Figure 5:
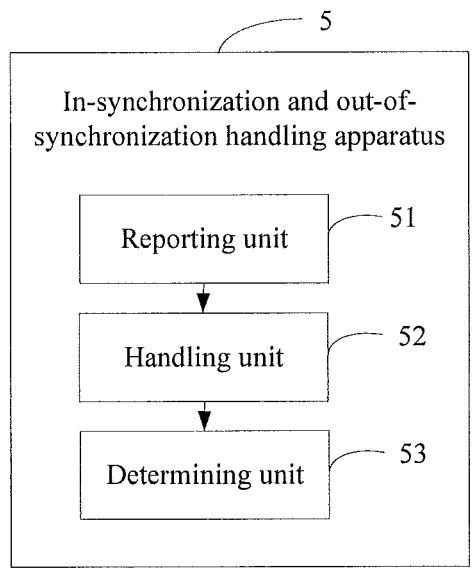
FIG. 5 is a structural diagram of an in-synchronization and out-of-synchronization handling apparatus according to another embodiment of the present invention.

FIG. 5 shows a structure of an in-synchronization and out-of-synchronization handling apparatus according to another embodiment of the present invention. For the convenience of description, only parts related to the embodiment of the present invention are shown.

The in-synchronization and out-of-synchronization handling apparatus may run within a variety of terminal devices (such as a user terminal and a base station).

The in-synchronization and out-of-synchronization handling apparatus 5 includes a reporting unit 51, a handling unit 52, and a determining unit 53, where specific functions of the units are as follows.

The reporting unit 51 is configured to report an invalid frame indication to a high layer by using a physical layer, where the invalid frame indication is used to indicate an invalid frame, and the invalid frame is a frame not used for detecting out-of-synchronization.

The handling unit 52 is configured to modify timing of a timer by using the high layer when the high layer receives the invalid frame indication, so as to calculate the number of frames that are assured to be out of synchronization within the timing.

The determining unit 53 is configured to determine, when the number of frames that are assured to be out of synchronization within the timing reaches a predefined value, that radio link is out of synchronization.

Further, the handling unit 52 is specifically configured to suspend timing of the timer within the invalid frame by using the high layer when the high layer receives the invalid frame indication, so that the high layer performs timing by using the timer only within valid frames that do not include the invalid frame indication, to calculate the number of frames that are assured to be out of synchronization within the timing, where the valid frame is a frame used for detecting out-of-synchronization.

Alternatively, the handling unit 52 is specifically configured to increase duration to obtain the timing by using the high layer when the high layer receives the invalid frame indication, where the increased duration is duration of the invalid frame received by the high layer, so that the high layer counts the number of frames that are not out of synchronization within the timing, to obtain the number of frames that are assured to be out of synchronization within the timing.

Further, the determining unit 53 is further configured to determine, when the number of frames that are out of synchronization within the timing does not reach the predefined value, that the radio link is not out of synchronization.

Persons skilled in the art may clearly understand that, for the convenience and brevity of description, the division of the functional units are merely described as an example. In actual application, the functional may be assigned to different functional units to perform according to requirements, that is, the interior structure of the apparatus is divided into different functional units to perform all or partial functions described above. In addition, the specific name of the functional units are merely used to distinguish each other, and are not used to limit the protection scope of the present application. A corresponding process in the foregoing method embodiment may be referenced for the specific operation process of the apparatus and units described above, and will not be described repeatedly herein.

Another Embodiment

Figure 6:
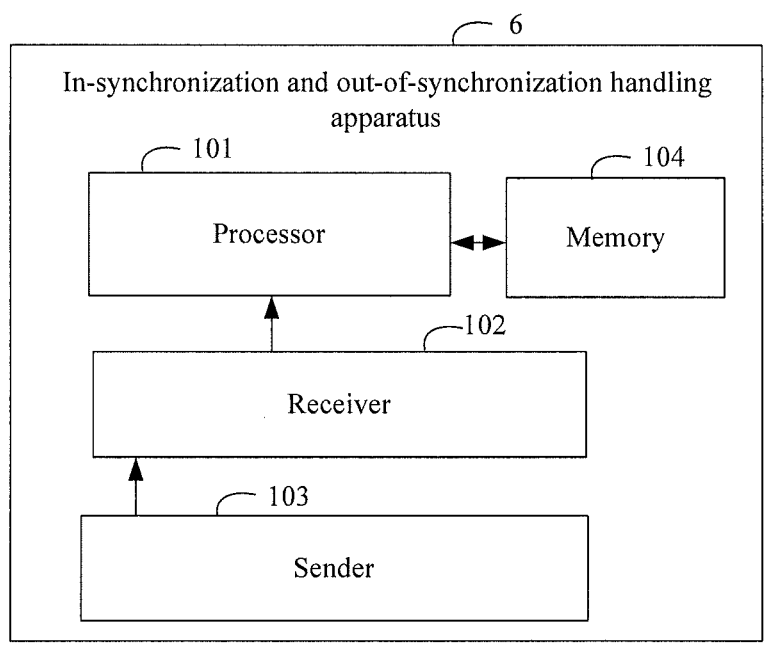
FIG. 6 is a structural diagram of an in-synchronization and out-of-synchronization handling apparatus according to another embodiment of the present invention.

FIG. 6 shows a structure of an in-synchronization and out-of-synchronization handling apparatus according to another embodiment of the present invention. For the convenience of description, only parts related to the embodiment of the present invention are shown.

The in-synchronization and out-of-synchronization handling apparatus 6 includes a processor 101, a receiver 102, and a sender 103. The sender 103 is located on a physical layer and is configured to report an invalid frame indication to a high layer, where the invalid frame indication is used to indicate an invalid frame, and the invalid frame is a frame not used for detecting out-of-synchronization. The receiver 102 is located on the high layer and is configured to receive the invalid frame indication sent by the sender 103 on the physical layer; upon receiving the invalid frame indication, modify timing of a timer by using the processor 101 of the high layer, so as to count the number of frames that are assured to be out of synchronization within the timing; when the number of frames that are assured to be out of synchronization within the timing reaches a predefined value, determine that a radio link is out of synchronization; and when the number of frames that are assured to be out of synchronization within the timing does not reach the predefined value, determine that the radio link is not out of synchronization.

Further, the sender 103 is further configured to report a valid frame indication to the high layer, which specifically is reporting an invalid frame indication when a current frame is a radio frame in an invalid slot; otherwise, reporting a valid frame indication.

Further, when the receiver 102 receives the invalid frame indication, the processor 101 suspends timing of the timer within the invalid frame by using the high layer, so that the high layer performs timing by using the timer only within valid frames that do not include the invalid frame indication, to calculate the number of frames that are assured to be out of synchronization within the timing, where the valid frame is a frame used for detecting out-of-synchronization.

Alternatively, when the receiver 102 receives the invalid frame indication, the processor 101 increases duration to obtain the timing by using the high layer, where the increased duration is duration of the invalid frame received by the high layer, so that the high layer counts the number of frames that are not out of synchronization within the timing, to obtain the number of frames that are assured to be out of synchronization within the timing.

The processor 101 is a control center of the in-synchronization and out-of-synchronization handling apparatus 6, and connects various parts in the whole in-synchronization and out-of-synchronization handling apparatus 6 by using various interfaces and channels. The processor 101 modifies the timing of the timer according to the invalid frame indication received by the receiver 102. Alternatively, the processor 101 may include one or more processing units, and may integrate an application processor and a modulation and demodulation processor, where the application processor primarily handles an operating system, a user interface, an application program, and the like; and the modulation and demodulation processor primarily handles radio communication, where the radio communication may use any communication standard or protocol, which includes but is not limited to GSM (Global System of Mobile communication, Global System for Mobile Communications), GPRS (General Packet Radio Service, General Packet Radio Service), CDMA (Code Division Multiple Access, Code Division Multiple Access), WCDMA (Wideband Code Division Multiple Access, Wideband Code Division Multiple Access), LTE (Long Term Evolution, Long Term Evolution), email, SMS (Short messaging service, short messaging service), and the like. It may be understood that the modulation and demodulation processor is also allowed not to be integrated in the processor 101.

It should be noted that persons skilled in the art may understand that the in-synchronization and out-of-synchronization handling apparatus 6 may further include a memory 104, where the processor 101 executes a software program and module stored in the memory 104, thereby performing various function application and data processing for the in-synchronization and out-of-synchronization handling apparatus 6.

Persons skilled in the art may understand that, the structure illustrated in FIG. 6 does not constitute a limit to the in-synchronization and out-of-synchronization handling apparatus 6, where more or less components than those illustrated in the figure may be included, or some components may be combined, or a different component arrangement may be provided.

The in-synchronization and out-of-synchronization handling apparatus 6 according to this embodiment may employ the corresponding in-synchronization and out-of-synchronization handling method described above. The related description of the corresponding embodiment in FIG. 4 of the in-synchronization and out-of-synchronization handling method may be referenced for details, and will not be described repeatedly herein.

According to the above description, in the embodiments of the present invention, the physical layer, besides reporting the in-synchronization indication or the out-of-synchronization indication to the high layer, also reports an invalid frame indication or a valid frame indication to the high layer; when the high layer receives the invalid frame indication, the timing of the timer is modified by using the high layer. Because the modified timing of the timer increases and the number of in-synchronization indications increase proportionally, more in-synchronization indications are reported before the timer expires, which increases the probability of in-synchronization indication reporting, thereby effectively avoiding the problem that makes it likely to determine a radio link failure.

In the embodiments provided in the present application, it should be understood that the disclosed device and method may be implemented in other manners. For example, the described apparatus embodiment is merely exemplary. For example, the division of the modules or units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit are implemented in a form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in a form of a software product. The computer software product is stored in a storage medium, and includes several instructions for instructing a computer device (which may be a personal computer, a server, or a network device) or a processor (processor) to perform all or a part of the steps of the methods described in the embodiments of the present application. The foregoing storage medium includes: any medium that can store program codes, such as a USB flash disk, a removable hard disk, a read-only memory. (Read-Only Memory, ROM), a random access memory (Random Access Memory, RAM), a magnetic disk, or an optical disk.

It should be noted that the foregoing embodiments are merely intended for describing the technical solutions of the present application other than limiting the present application. Although the present application is described in detail with reference to the foregoing embodiments, persons of ordinary skill in the art should understand that they may still make modifications to the technical solutions described in the foregoing embodiments, or make equivalent replacements to some technical features thereof, without departing from the spirit and scope of the technical solutions of the embodiments of the present application.

What is claimed is:

1. An in-synchronization and out-of-synchronization handling method, comprising;
reporting an invalid frame indication to a high layer by using a physical layer, wherein the invalid frame indication is used to indicate an invalid frame, and the invalid frame is a frame not used for detecting out-of-synchronization;
upon receiving, by the high layer, the invalid frame indication, modifying timing of a timer by using the high layer to calculate the number of frames that are assured to be out of synchronization within the timing; and
when the number of frames that are assured to be out of synchronization reaches a predefined value within the timing, determining that radio link is out of synchronization, wherein the modifying the timing of the timer by using the high layer to calculate the number of frames that are assured to be out of synchronization within the timing comprises:
suspending, by using the high layer, timing of the timer in the invalid frame, so that the high layer performs timing by using the timer only within valid frames that do not comprise the invalid frame indication, to calculate the number of frames that are assured to be out of synchronization within the timing, wherein the valid frame is a frame used for detecting out-of-synchronization.

2. The method according to claim 1, further comprising: when the number of frames that are out of synchronization within the timing does not reach the predefined value, determining that the radio link is not out of synchronization.

3. The method according to claim 1, wherein the radio link is a radio communication link of a base station or a user equipment.

4. An in-synchronization and out-of-synchronization handling method, comprising:
reporting an invalid frame indication to a high layer by using a physical layer, wherein the invalid frame indication is used to indicate an invalid frame, and the invalid frame is a frame not used for detecting out-of-synchronization;
upon receiving, by the high layer, the invalid frame indication, modifying timing of a timer by using the high layer to calculate the number of frames that are assured to be out of synchronization within the timing; and
when the number of frames that are assured to be out of synchronization reaches a predefined value within the timing, determining that radio link is out of synchronization, wherein the modifying the timing of the timer by using the high layer to calculate the number of frames that are assured to be out of synchronization within the timing comprises:
increasing, by using the high layer, duration of the timer to obtain the timing, wherein the increased duration is duration of the invalid frame received by the high layer, so that the high layer counts the number of frames that are not out of synchronization within the timing, to obtain the number of frames that are assured to be out of synchronization within the timing.

5. The method according to claim 4, further comprising: when the number of frames that are out of synchronization within the timing does not reach the predefined value, determining that the radio link is not out of synchronization.

6. The method according to claim 4, wherein the radio link is a radio communication link of a base station or a user equipment.

7. An in-synchronization and out-of-synchronization handling apparatus, comprising:
a non-transitory computer readable storage medium to store program(s), and
a processor configured to, including configured by the program(s) to:
report an invalid frame indication to a high layer by using a physical layer, wherein the invalid frame indication is used to indicate an invalid frame, and the invalid frame is a frame not used for detecting out-of-synchronization;
modify timing of a timer by using the high layer when the high layer receives the invalid frame indication, so as to calculate the number of frames that are assured to be out of synchronization within the timing, wherein the modify comprises to suspend, by using the high layer, timing of the timer in the invalid frame, so that the high layer performs timing by using the timer only within valid frames that do not comprise the invalid frame indication, to calculate the number of frames that are assured to be out of synchronization within the timing, wherein the valid frame is a frame used for detecting out-of-synchronization; and
determine, when the number of frames that are assured to be out of synchronization within the timing reaches a predefined value, that radio link is out of synchronization.

8. The apparatus according to claim 7, wherein the processor is configured to suspend, by using the high layer when the high layer receives the invalid frame indication, timing of the timer within the invalid frame, so that the high layer performs timing by using the timer only within valid frames that do not comprise the invalid frame indication, to calculate the number of frames that are assured to be out of synchronization within the timing, wherein the valid frame is a frame used for detecting out-of-synchronization.

9. The apparatus according to claim 7, wherein the processor is configured to: when the high layer receives the invalid frame indication, increase duration of the timer by using the high layer to obtain the timing, wherein the increased duration is duration of the invalid frame received by the high layer, so that the high layer counts the number of frames that are not out of synchronization within the timing, to obtain the number of frames that are assured to be out of synchronization within the timing.

10. The apparatus according to claim 7, wherein the processor is further configured to
determine, when the number of frames that are out of synchronization within the timing does not reach the predefined value, that the radio link is not out of synchronization.

11. The apparatus according to claim 7, wherein the apparatus is located within a base station or a user equipment.

12. An in-synchronization and out-of-synchronization handling apparatus, comprising:

a non-transitory computer readable storage medium to store program(s), and a processor configured to, including configured by the program(s) to:

report an invalid frame indication to a high layer by using a physical layer, wherein the invalid frame indication is used to indicate an invalid frame, and the invalid frame is a frame not used for detecting out-of-synchronization;

modify timing of a timer by using the high layer when the high layer receives the invalid frame indication, so as to calculate the number of frames that are assured to be out of synchronization within the timing, wherein the modify comprises to increase, by using the high layer, duration of the timer to obtain the timing, wherein the increased duration is duration of the invalid frame received by the high layer, so that the high layer counts the number of frames that are not out of synchronization within the timing, to obtain the number of frames that are assured to be out of synchronization within the timing; and determine, when the number of frames that are assured to be out of synchronization within the timing reaches a predefined value, that radio link is out of synchronization.

13. The apparatus according to claim 12, wherein the processor is configured to suspend, by using the high layer when the high layer receives the invalid frame indication, timing of the timer within the invalid frame, so that the high layer performs timing by using the timer only within valid frames that do not comprise the invalid frame indication, to calculate the number of frames that are assured to be out of synchronization within the timing, wherein the valid frame is a frame used for detecting out-of-synchronization.

14. The apparatus according to claim 12, wherein the processor is configured to: when the high layer receives the invalid frame indication, increase duration of the timer by using the high layer to obtain the timing, wherein the increased duration is duration of the invalid frame received by the high layer, so that the high layer counts the number of frames that are not out of synchronization within the timing, to obtain the number of frames that are assured to be out of synchronization within the timing.

15. The apparatus according to claim 12, wherein the processor is further configured to determine, when the number of frames that are out of synchronization within the timing does not reach the predefined value, that the radio link is not out of synchronization.

16. The apparatus according to claim 12, wherein the apparatus is located within a base station or a user equipment.

* * * * *